United States Patent [19]
Mort

[11] 4,328,669
[45] May 11, 1982

[54] VACUUM POWER SYSTEM AND REGULATOR THEREFOR

[75] Inventor: Dewey F. Mort, Dayton, Ohio
[73] Assignee: General Motors Corporation, Detroit, Mich.
[21] Appl. No.: 121,671
[22] Filed: Feb. 15, 1980
[51] Int. Cl.³ ............................................. F16D 31/02
[52] U.S. Cl. ...................................... 60/397; 60/421; 123/198 R
[58] Field of Search ................. 60/397, 721, 407, 409, 60/421; 123/198 R; 180/175, 177; 91/28, 29, 514, 517

[56] References Cited
U.S. PATENT DOCUMENTS
2,583,120  1/1952  Rappl .............................. 123/198 R
2,732,685  1/1956  Oishei .................................... 60/397
3,006,535  10/1961  White .................................... 60/397

*Primary Examiner*—Allen M. Ostrager
*Assistant Examiner*—Stephen F. Husar
*Attorney, Agent, or Firm*—D. D. McGraw

[57] ABSTRACT

A vehicle vacuum power system which insures sufficient vacuum power to operate a vacuum brake booster and a vacuum operated road speed control system. Because of the low vacuum, high flow rate needs of a cruise control system, the cruise control is connected directly to the engine manifold through a check valve. A small orifice from the vacuum pump in parallel with engine manifold vacuum provides sufficient vacuum for the cruise control when the manifold vacuum is not sufficient. The vacuum pump is in series with manifold vacuum and is operated in response to a pressure switch which allows the pump to run only when brake booster vacuum is low. Manifold vacuum is sufficient most of the time, but the orifice to the cruise control tends to cause a fast loss of brake booster vacuum, causing the vacuum pump to run when it is not actually needed. The vacuum regulator shuts off the flow through the orifice when it is not needed, considerably reducing the pump operational time. The regulator is a two-piece housing with a spring loaded diaphragm controlling a regulator port. Atmospheric pressure is on one side of the diaphragm and engine manifold vacuum is on the other.

3 Claims, 2 Drawing Figures

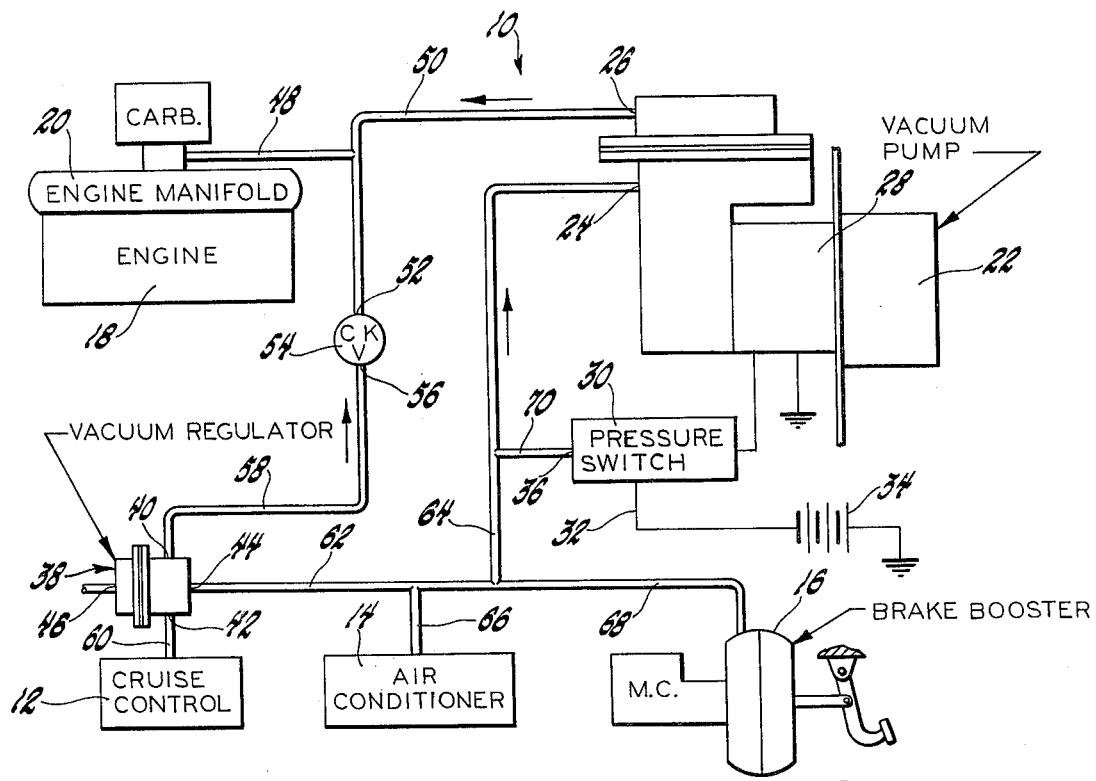
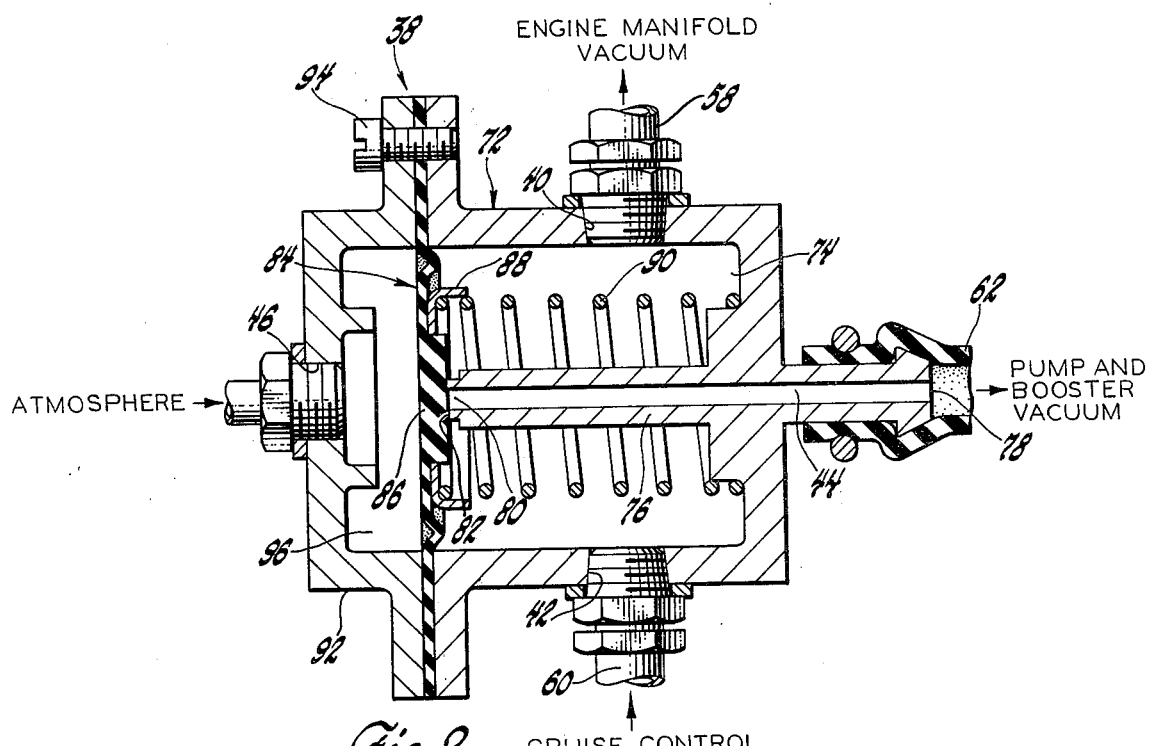
Fig. 1
Fig. 2

VACUUM POWER SYSTEM AND REGULATOR THEREFOR

The invention relates to a vacuum power system and a regulator forming a part of the system, and more particularly to an arrangement for insuring sufficient vacuum power to operate at least two vacuum powered devices when, under some conditions of operation, the primary vacuum source may provide insufficient vacuum power. The system is particularly useful in a system having such vacuum power operated devices as a brake booster, a road speed control, air conditioning or heating system doors operated by vacuum motors, etc.

Due to various demands on vehicle internal combustion engines which are used to power automotive vehicles, there may be occasions in which insufficient engine intake manifold vacuum is available to operate such devices as the road speed control transducer and motor, a vacuum operated power brake booster, or other vacuum powered devices such as doors in the ventilating system. A vacuum pump may be provided to increase the amount of vacuum power available. The system embodying the invention incorporates an electric motor-driven vacuum pump with a pressure switch which allows the pump to run only when brake booster vacuum is low. The road speed control transducer and vacuum motor require low absolute pressures and high flow rates. They are therefore connected directly to the engine intake manifold through a check valve so that vacuum power is normally provided to them directly from the manifold. Manifold vacuum is sufficient to operate the various vacuum powered devices for a very high percentage of the time. It is therefore desirable to operate the vacuum pump only when required. A vacuum regulator and a pressure sensitive switch are provided for this purpose.

The primary vacuum power supply to the road speed control system from the engine intake manifold is made through the vacuum regulator. The engine intake manifold is also connected to the discharge side of the vacuum pump. The inlet side of the vacuum pump is connected to the regulator, the vacuum suspended power brake booster, and other vacuum powered devices as well as the pressure switch which controls operation of the vacuum pump. When engine intake manifold vacuum is sufficient for operation of the vehicle road speed control, the vacuum regulator operates to close off flow from the road speed control system toward the vacuum pump. When engine intake manifold vacuum is not sufficient, the regulator operates to permit air flow from the road speed control system through the regulator and, passing through an orifice, to the vacuum pump inlet. This system conserves vacuum supply in the vacuum suspended power brake booster so that it is not used unnecessarily by the road speed control system. Consequently, the vacuum pump works a small percentage of the time, but operates when required. The vacuum pump operates variably as needed to maintain sufficient vacuum power to operate the vacuum operated devices.

IN THE DRAWING:

FIG. 1 is a schematic representation of a vacuum power system embodying the invention.

FIG. 2 is a cross section view, with parts broken away, used in the system of FIG. 1.

The vacuum power system 10 is illustrated as including several vacuum power operated devices. Examples of such devices include the road speed control 12, portions of the ventilation and air conditioning system 14, and the vacuum suspended power brake booster 16. Since each of these use vacuum power for operation, each is considered to be a vacuum power operated device. Some vehicles may not have all of these devices installed, but will quite commonly have at least two vacuum operated devices. The vehicle in which the system is installed includes an engine 18 having an intake manifold 20 which operates as a source of vacuum power. The system of FIG. 1 also includes a vacuum pump 22 having an inlet 24 and an outlet 26. Pump 22 is suitably driven by an electric motor 28. The operation of motor 28 is controlled by a pressure switch 30 which is connected in the electrical circuit 32 for motor 28. A battery 34 is schematically illustrated as being connected in circuit 32 to provide electrical power. Switch 30 has a port 36.

A vacuum regulator 38 is provided with an outlet port 40, an inlet port 42 and an outlet port 44. As better shown in FIG. 2, it also has a port 46 communicating with atmosphere. A conduit 48 connects the engine intake manifold 20 to the remainder of the system. Conduit 48 in turn is connected to a conduit 50 intermediate the ends of that conduit. One end of conduit 50 is connected to the vacuum pump outlet 26 and the other end is connected to the outlet 52 of a check valve 54. The check valve has an inlet 56 connected by a conduit 58 to the outlet port 40 of the vacuum regulator. Another conduit 60 connects the regulator inlet port 42 with the road speed control 12. The vacuum regulator outlet port 44, which also is an orifice, is connected by conduit 62 to the vacuum pump inlet 24 through another conduit 64. The vacuum power operated parts of ventilating and air conditioning system 14 are schematically shown as being connected to conduit 62 by conduit 66. The vacuum suspended brake booster 16 is connected to conduits 62 and 64 by conduit 68. Another conduit 70 connects the port 36 of pressure switch 30 with conduit 64.

The vacuum regulator 38 is illustrated in greater detail in FIG. 2. It has a housing 72 defining a subatmospheric pressure chamber 74 to which ports 40 and 42 are directly connected. The housing is schematically illustrated as being constructed to provide a tubular section 76 through which port 44 is formed as a passage. Thus port 44 has one end 78 to which conduit 62 is connected and another end 80 opening within chamber 74. The opening of port end 80 through the tubular section 76 provides a valve seat 82. A diaphragm assembly 84 closes one end of chamber 74 and has a center portion forming a valve section 86 which cooperates with valve seat 82 to open and close port 44 relative to chamber 74 as the diaphragm assembly 84 is moved in a manner to be described. Diaphragm assembly 84 has a spring seat 88 on the side thereof facing chamber 74. A compression spring 90 is received in chamber 74 and one end engages spring seat 88. The other spring end reacts on a portion of housing 72. Spring 90 is therefore positioned about the tubular section 76. Housing 72 also includes a cap 92 which holds the diaphragm assembly 84 in place, being secured to the main portion of the housing by suitable means such as screws 94. Port 46 is formed in cap 92 and is connected to atmosphere so that the chamber 96 formed by cap 92 and one side of diaphragm assembly 84 is an atmospheric pressure chamber.

In normal operation of the vehicle in which the system is installed, the engine intake manifold 20 will provide vacuum power through check valve 54 to chamber 74 of the vacuum regulator 38. The flow rate and the vacuum level will be such that diaphragm assembly 84 is in the position shown in FIG. 2 wherein valve section 86 engages valve seat 82 and port 44 is closed. Sufficient vacuum is present in the brake booster 16 and therefore in conduits 62 and 64 to hold pressure switch 30 open so that the vacuum pump 22 is not operated when there is no requirement for vacuum power. Under many conditions of operation, the engine intake manifold 20 provides sufficient vacuum power to accommodate the road speed control system 12 when that system is activated. Therefore port 44 remains closed.

If there is insufficient intake manifold vacuum to provide the needed vacuum power to the activated road speed control, vacuum power is provided from the portion of the system connected to conduits 62 and 64. Due to insufficient vacuum from the intake manifold, diaphragm assembly 84 will sense the lack of sufficient vacuum power and will act to move valve section 86 away from valve seat 84 to open port 44 to chamber 74. This will communicate the higher vacuum level in conduit 62 to the road speed control through port 42 and conduit 60 and also through port 40 and conduit 58 to check valve 54. The check valve will close when there is a higher level of vacuum in conduit 58 than in conduit 50. Thus the reservoir of vacuum in the brake booster 16 is immediately available to supplement and operate the road speed control 12 when necessary. As the change in vacuum level in conduit 64 approaches a high absolute pressure limit, pressure switch 30 will close and vacuum pump 22 will be energized by its motor 28. The pump will therefore change the vacuum absolute pressure level to a lower amount in conduits 62, 64 and 68 in devices connected thereto. When the vacuum absolute pressure level reaches a desired minimum absolute pressure, switch 30 will then open and deactivate pump 22. Thus the road speed control system 12 and other devices depending upon vacuum power for operation are assured of a sufficient vacuum power for such operation even when the engine intake manifold cannot provide sufficient vacuum power.

Should the vacuum pump 22 be inoperable for some reason, some vacuum power can be delivered to the brake booster 16 and other devices from the engine intake manifold 20 through regulator 38. This can occur as chamber 74 is subjected to subatmospheric pressure which is insufficient to move diaphragm assembly 84 against the force of spring 90 to close valve section 86 against valve seat 82. Thus whatever subatmospheric pressure is found in chamber 74 it can be transmitted through port 44 to conduit 62 and thereafter to the brake booster and other vacuum power operated devices to provide partial vacuum power if not full vacuum power.

The embodiments of the invention in which an exclusive property or privilege is claimed are defined as follows:

1. A vacuum power system having first and second devices operable by vacuum power and first and second sources of vacuum power, said first source when operating normally providing sufficient vacuum power to operate said first device and said second source providing sufficient vacuum power to operate said second device, said second source being variably operable to maintain the vacuum operating level required by said second device;

means sensing the lack of sufficient vacuum power from said first source to operate said first device when such lack occurs, said means then acting to communicate sufficient vacuum power from said second source to said first device to operate said first device;

and means responsive to changes in vacuum level provided from said second source as vacuum power therefrom is used to cause said second source to be operated variably as needed to maintain at least sufficient vacuum power to operate said first and second devices.

2. A vacuum power system having first and second devices operable by vacuum power, a vacuum power reservoir and first and second sources of vacuum power, said first source when operating normally providing sufficient vacuum power to operate said first device, said second source being variably operable to maintain a reservoir of vacuum power in said vacuum power reservoir at the vacuum operating level required by said second device;

means sensing the lack of sufficient vacuum power from said first source to operate said first device when such lack occurs, said means then acting to communicate sufficient vacuum power from vacuum power reservoir and said second source to said first device to operate said first device;

and means responsive to changes in vacuum level provided from said second source as vacuum power therefrom is used to cause said second source to be operated variably as needed to maintain at least sufficient vacuum power to operate said first and second devices.

3. A subatmospheric pressure power system comprising:

an engine intake providing a first source of subatmospheric pressure when the engine is operating;

a vacuum pump having an inlet and an outlet and providing a second source of subatmospheric pressure and being selectively operable to maintain subatmospheric pressure within a predetermined range at the pump inlet, said pump outlet being in communication with said engine intake to decrease the pressure differential across said pump when said engine intake and said pump are operating to provide subatmospheric pressure;

a vacuum suspended brake booster connected to said pump inlet to receive subatmospheric pressure from said pump;

vacuum pump control means sensing the subatmospheric pressure values supplied to said brake booster from said pump and operable to cause said pump to be operated when the sensed subatmospheric pressure value reaches a first predetermined value and to cause said pump to cease operation when the sensed subatmospheric pressure value reaches a second predetermined value;

a vehicle road speed control operated by subatmospheric pressure when operating and requiring a predetermined value of subatmospheric pressure;

and a subatmospheric pressure regulator having a subatmospheric pressure chamber, a first port opening into said chamber and receiving subatmospheric pressure from said engine intake, a second port opening into said chamber and receiving subatmospheric pressure from said pump inlet, a third port opening into said chamber and connected to said vehicle road speed control to supply subatmospheric pressure thereto, and means responsive to subatmospheric pressure in said chamber and to atmospheric pressure and, upon the occurrence of a predetermined minimum pressure differential therebetween which is numerically slightly greater than the value of the subatmospheric pressure required to operate said road speed control, acting to communicate pump inlet subatmospheric pressure to said regulator chamber to assure the presence of sufficient subatmospheric pressure to operate said road speed control, said means closing said second port and preventing communication of pump inlet subatmospheric pressure to said regulator chamber when said engine intake is providing sufficient subatmospheric pressure at said regulator first port and in said chamber and at said third port to operate said road speed control.

* * * * *